Oct. 31, 1961

AN WANG 3,007,142

MAGNETIC FLUX STORAGE SYSTEM

Filed June 6, 1957

INVENTOR.
AN WANG

BY John E. Dougherty Jr.

ATTORNEY

United States Patent Office 3,007,142

Patented Oct. 31, 1961

3,007,142

MAGNETIC FLUX STORAGE SYSTEM

An Wang, Lincoln, Mass., assignor to International Business Machines Corporation, New York, N.Y., a corporation of New York Filed June 6, 1957, Ser. No. 664,128

3 Claims. (Cl. 340—174)

This invention is directed to digital information handling systems and in particular to a circuit arrangement employing magnetic cores that is operable as a scaler device usable in such systems.

Magnetic core elements have been employed heretofore as binary storage devices wherein the limiting remanent states of flux orientation in opposite directions are utilized to represent one and zero information states. Information is stored and read out of these elements by application of a magnetomotive force of first one sense and then of the opposite sense. It has been determined that a plurality of stable flux states intermediate these two opposite remanence states may be established in a magnetic core so that information may be stored therein in other than binary form. In attaining such an intermediate flux condition a predetermined quantity of magnetizing force may be applied to a core with this force being less than that amount sufficient to cause a complete flux reversal. Such a quantified force may be applied by means of current pulses traversing a winding about the core and may be metered so as to require a predetermined number of like pulses for causing a traversal of the hysteresis loop from one datum remanence state to the opposite remanence state.

In accordance with the present invention a scaler is provided employing the above described flux storage principle wherein the quantification of input pulses to be stored is accomplished by a further magnetic core that is operated in binary fashion.

An object of the invention is to provide an improved magnetic core scaler device.

A further object of the invention is to provide a scaler device employing a magnetic core that is capable of attaining a plurality of stable flux conditions intermediate two opposite remanence flux states and which is driven under control of a further magnetic core.

One feature of the invention resides in the arrangement for controlling the operation of the further core in binary fashion by means of a regenerative feedback circuit which allows input signal pulses of low power and short duration to be used.

Another feature of the invention resides in the provision of a novel regenerative feedback magnetic core switching circuit arrangement.

Another feature of the invention comprises a feedback control for a flux storage core whereby this core is reset to a datum state upon receipt of a predetermined number of input pulses by the circuit.

Other objects of the invention will be pointed out in the following description and claims and illustrated in the accompanying drawings, which disclose, by way of example, the principle of the invention and the best mode, which has been contemplated, of applying that principle.

Figure 2:
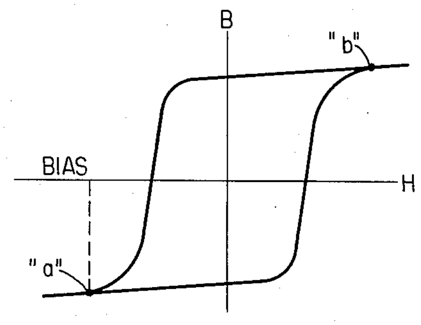
FIGURE 2 represents another hysteresis loop illustrating specifically the flux condition obtained by applying a steady state bias field to a magnetic core employed in the circuitry of FIGURE 3.
Figure 3:
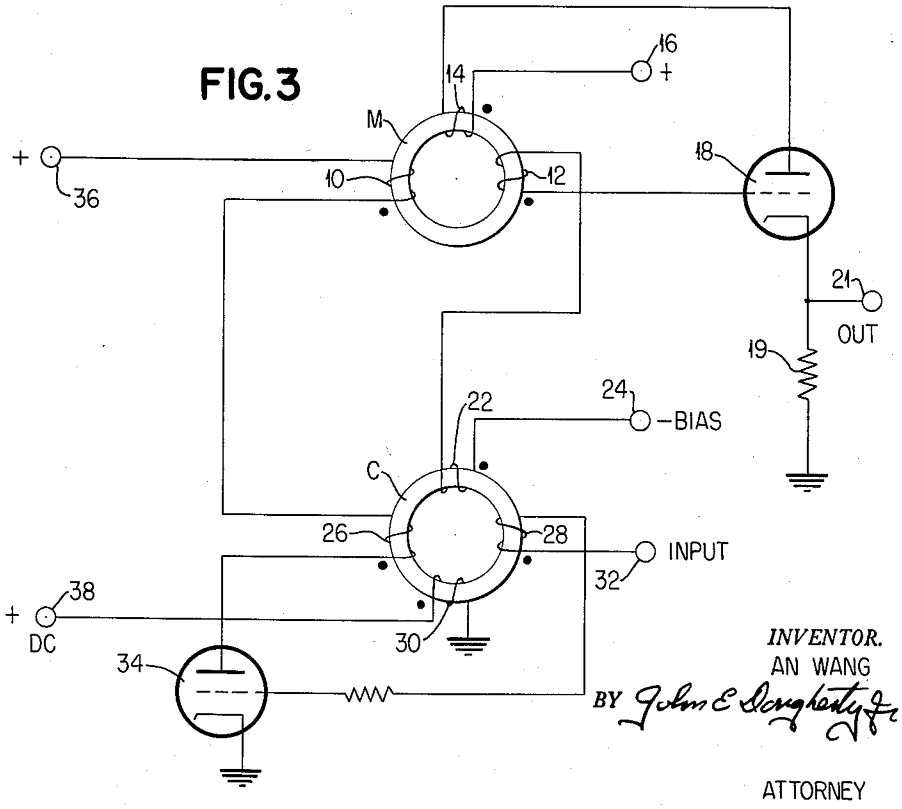
FIGURE 3 is a schematic circuit diagram illustrating the scaler arrangement provided in accordance with the invention.

Referring now to FIGURE 3, a multi-stable magnetic core M is provided with an input winding 10, an output winding 12 and a reset winding 14. A dot marking is shown adjacent one end of each of these windings, as well as other windings to be later described, and serves to indicate its winding sense or polarity. In accordance with this convention, a positive current impulse directed into the dot marked terminal tends to establish a datum remanance condition of flux density which may be arbitrarily designated as the lowermost remanence point of the hysteresis curves shown in FIGURES 1 and 2. When the magnetic state of a core is shifted from the upper remanence state toward the lower or datum remanence state, the dot marked terminal of these windings will then be positive with respect to the voltage induced therein as a result of such flux change.

The unmarked terminal of the winding 14 is connected to a source of positive voltage through a terminal 16 while the opposite terminal is connected to the plate electrode of a triode vacuum tube 18 which has its cathode coupled to ground or the negative terminal of the source through a resistor 19. An output terminal 21 may be connected to the cathode end of the resistor 19.

The dot marked terminal of winding 12 is coupled to the grid electrode of the tube 18 with the opposite winding terminal connected in opposition to a winding 22 of a further core designated by the label C. The dot marked terminal of this latter winding 22 is connected to a negative source of potential through a terminal 24 whereby the grid of tube 18 is normally biased so as to render it nonconductive.

The core C functions as the pulse quantifying element and is provided with additional windings 26, 28 and 30. The winding 28 comprises an input coil adapted, with the polarity shown, to receive positive input pulses as applied to a terminal 32. The opposite terminal of the winding 28 is coupled to the grid electrode of a vacuum tube 34 which has its cathode grounded as shown and its anode electrode connected to the dot marked terminal of winding 26. The winding 26 is connected in series aiding polarity with the aforementioned winding 10 of core M and the remaining or unmarked terminal of this winding is connected to the positive terminal of a potential source, not shown, through a terminal 36.

Winding 30 on the core C is coupled through its dot marked end to a terminal 38 upon which a steady state positive voltage is applied. In the circuit thus far described each of the voltage sources mentioned is considered to have the appropriate terminal grounded so as to provide a return current path through the grounded connection shown.

Figure 1:
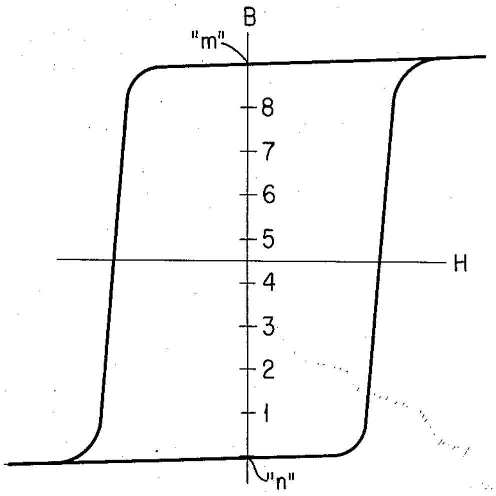
FIGURE 1 represents graphically the hysteresis characteristic obtained for a rectangular type magnetic material with intermediate points shown to designate flux density conditions that may be established intermediate two opposite remanence states.

The effect of the bias current upon the winding 30 of core C is such as to apply a field in a negative sense, being directed into the dot marked terminal, and this core stands normally at point "*a*" on the hysteresis loop shown in FIGURE 2. On the other hand the core M initially stands at point "*n*," which is the reset or datum state of this core as shown in FIGURE 1, and, if the parameters of the circuit are so selected, may be made to attain a flux density at point "*m*" in successive steps with a predetermined number of quantified input pulses applied. As illustrated, nine intermediate steps are required so that the device may function as a decade scaler as will be evident from the following description of the mode of operation.

Signal pulses to be counted may be of short duration and, as mentioned previously, may be positive for the winding sense of the winding 28 as illustrated. The terminal 32 may be held negative normally by a bias source with the input signal overcoming this negative condition for the duration of the input signal.

Such an input signal tends to shift the core C toward point "a" on the hysteresis loop of FIGURE 2 since it is of a polarity to cause current to flow into the dot marked terminal of winding 28 and at the same time raises the potential on the grid of tube 34 so as to cause conduction. When this occuurs there is a current flow from the source at terminal 36 through winding 26 of core C and winding 10 of core M. The magnetomotive force generated by winding 26 tends to reverse the direction of flux orientation and thereby drive the core C toward point "b," overcoming the effect of the signal on winding 28. As this change in flux progresses toward "b," a voltage is induced in the winding 28 causing the unmarked terminal to become positive. This action is regenerative and maintains tube 34 in an on state until there is a complete shift from "a" to "b." At this time tube 34 turns off and the direct current bias on winding 30 returns the core C to state "a." Since neither of the triodes 18 and 34 is conducting during this restoration, the signals induced in winding 22 and 26 do not produce any appreciable current flow in windings 12 and 10, respectively. In any event these latter windings are, with respect to the signals induced on the former, of opposite sense and apply cancelling magnetizing forces to core M.

During the interval that core C switches from "a" to "b," which controls the interval of conductivity of tube 34, the current pulse through winding 10 of core M drives it in a positive sense for one incremental step. This incremental step in core M then occurs simultaneously with the shift of core C from "a" to "b" and the voltage induced in winding 22 is opposed by that induced in the winding 12 so that the tube 18 remains non-conductive. In the decade system illustrated, after nine such input pulses applied to terminal 32 with the core C switching with each pulse and returned by the dircet current bias, the core M reaches the flux state "m" opposite from its datum condition "n." The tenth pulse again operates core C but the core M having reached remanence switches somewhat positive along the nearly flat portion of the loop and little flux change occurs. This causes an insignificant voltage to be induced in the winding 12 and the voltage induced in winding 22 of core C now is effective to raise the potential of the grid of tube 18 sufficient to fire this tube. When this takes place there is a current flow from terminal 16 into the marked end of winding 14 so as to shift core M back to point "n" with winding 12 now acting regeneratively to keep the grid of tube 18 positive until complete switching of the core M takes place.

An output signal then may be obtained at the terminal 21, for each group of ten input signals applied to the terminal 32.

While there have been shown and described and pointed out the fundamental novel features of the invention as applied to preferred embodiment, it will be understood that various omissions and substitutions and changes in the form and details of the device illustrated and in its operation may be made by those skilled in the art without departing from the spirit of the invention. It is the intention therefore, to be limited only as indicated by the following claims.

What is claimed is:

1. A magnetic circuit including a first core of magnetic material capable of assuming first and second limiting remnanent states of flux orientation in opposite directions and a plurality of remanent states intermediate said limiting states; means for switching said first core in step by step fashion from said first limiting state to said second limiting state and thereafter restoring said first core to said first limiting state comprising, a second core of magnetic material normally in a state with the flux therein orientated in a first direction but capable of being caused to assume a state with the flux therein orientated in a second direction, first winding means linking said first and second cores effective each time it is energized for a predetermined time interval to completely reverse the flux in said second core and to partially reverse the flux in said first core so that said first core assumes the next intermediate state in the direction of said second limiting state, second winding means on said second core regeneratively coupled to said first winding means on said second core, said regeneratively coupled windings being effective in response to the application of an input signal to maintain said first winding means energized for said predetermined time interval, third winding means linking said first and second cores with turns of opposite sense on which opposing voltages are induced in response to said complete flux reversals in said second core and partial flux reversals in said first core, fourth winding means linking said first core, and means regeneratively coupling said third and fourth winding means on said first core for restoring said first core to said first limiting state when said first winding is energized after said first core has been stepped to said second limiting state.

2. In a magnetic circuit including a first core of magnetic material capable of assuming first and second limiting remanent states of flux orientation in opposite directions and a plurality of remanent states intermediate said limiting states; impulse means for applying quantified magnetizing impulses to said first core to step said core from said first to said second limiting state, said impulse means comprising a second magnetic core capable of flux orientation in first and second directions, first winding means, means for applying energizing signals to said first winding means, said first winding means being effective each time it is energized to apply to said second core a magnetizing impulse to switch said second core from said first to said second state and coincidentally to apply to said first core a quantified magnetizing impulse effective to step said first core one step in the direction from said first to said second limiting state; and means for restoring said first core in response to the energization of said impulse means after said first core has been stepped to said second limiting state, said restoring means comprising second winding means linking said first and second cores with turns of opposite sense, reset winding means linking said first core, and an electronic control device regeneratively coupling said second winding means and said reset winding means on said first core.

3. In a magnetic circuit including a first core of magnetic material capable of assuming first and second limiting remanent states of flux orientation in opposite directions and a plurality of remanent states intermediate said limiting states; impulse means for applying quantified magnetizing impulses to said first core to step said core from said first to said second limiting state, said impulse means comprising a second magnetic core capable of flux orientation in first and second directions, first winding means, means for applying energizing signals to said first winding means, said first winding means being effective each time it is energized to apply to said second core a magentizing impulse to switch said second core from said first to said second state and coincidentally to apply to said first core a quantified magnetizing impulse effective to step said first core one step in the direction from said first to said second limiting state, second winding means linking said first and second cores with turns of opposite sense, said second winding means being adapted to have induced therein, when said first core is not in said second limiting state, balanced output signals in response to the energization of said impulse means, and to have induced therein an unbalanced output signal when said first core is in said second limiting state, and means activated by said unbalanced output signal for resetting said first core to said first limiting state and for generating an output signal from said circuit.

References Cited in the file of this patent

UNITED STATES PATENTS

| | | |
|---|---|---|
| 2,770,739 | Grayson | Nov. 13, 1956 |
| 2,772,370 | Bruce | Nov. 27, 1956 |
| 2,786,147 | Kaufmann | Mar. 19, 1957 |
| 2,800,596 | Bolie | July 23, 1957 |
| 2,801,345 | Eckert et al. | July 30, 1957 |
| 2,812,449 | Spencer | Nov. 5, 1957 |
| 2,838,669 | Horsch | June 10, 1958 |
| 2,876,438 | Jones | Mar. 3, 1959 |
| 2,902,609 | Ostroff et al. | Sept. 1, 1959 |
| 2,926,339 | Kramer et al. | Feb. 23, 1960 |